(12) United States Patent
Gould et al.

(10) Patent No.: US 8,645,701 B2
(45) Date of Patent: Feb. 4, 2014

(54) SYSTEM AND METHOD FOR ZONE SIGNING AND KEY MANAGEMENT IN A DNS SYSTEM

(75) Inventors: James Fred Gould, Leesburg, VA (US); Ramana Murthy Lavu, Ashburn, VA (US)

(73) Assignee: Verisign, Inc.

( * ) Notice: Subject to any disclaimer, the term of this patent is extended or adjusted under 35 U.S.C. 154(b) by 83 days.

(21) Appl. No.: 13/181,895

(22) Filed: Jul. 13, 2011

(65) Prior Publication Data

US 2012/0017090 A1    Jan. 19, 2012

Related U.S. Application Data

(60) Provisional application No. 61/363,961, filed on Jul. 13, 2010.

(51) Int. Cl.
*H04L 9/32* (2006.01)

(52) U.S. Cl.
USPC .......................................... 713/176; 380/282

(58) Field of Classification Search
USPC .............. 713/176; 380/277, 279, 44, 278, 30, 380/281–282
See application file for complete search history.

(56) References Cited

U.S. PATENT DOCUMENTS

| | | | | |
|---|---|---|---|---|
| 7,680,955 B2* | 3/2010 | Huang et al. | | 709/245 |
| 8,260,963 B2* | 9/2012 | Huang et al. | | 709/245 |
| 2006/0143711 A1* | 6/2006 | Huang et al. | | 726/23 |
| 2010/0161774 A1* | 6/2010 | Huang et al. | | 709/221 |
| 2012/0155646 A1* | 6/2012 | Seshadri et al. | | 380/279 |

OTHER PUBLICATIONS

Joe Gersch, "Deploying DNS Security (DNSSESC) in Large-Scale Operational Environments" 2009 IEEE, pp. 169-180.*

* cited by examiner

*Primary Examiner* — Samson Lemma
(74) *Attorney, Agent, or Firm* — MH2 Technology Law Group LLP

(57) ABSTRACT

Methods and systems for signing a DNS zone file and managing zone file signing are provided. An indication of a first DNS zone to be signed is received from one of several remote users, where each such remote user has control over a separate DNS zone. Unsigned zone data is retrieved for the first DNS zone to be signed and is cryptographically signed. The signed zone data is provided to a signed zone master for propagation to one or more DNS servers.

20 Claims, 12 Drawing Sheets

SYSTEM AND METHOD FOR ZONE SIGNING AND KEY MANAGEMENT IN A DNS SYSTEM

PRIOR APPLICATION

This application claims the benefit of priority to U.S. Provisional Patent Application No. 61/363,961, filed Jul. 13, 2010, the entire contents of which are hereby incorporated by reference in their entirety.

BRIEF DESCRIPTION

1. Technical Field

The present invention relates to zone signing and, more particularly, to a remote DNSSEC Signing Cloud system.

2. Background

DNSSEC is a set of extensions to the DNS protocol and system designed to deal with cache poisoning and a set of other DNS vulnerabilities such as man in the middle attacks and unauthorized data modification in authoritative servers. Its major objective is to provide origin authentication and integrity protection for DNS data. The public key infrastructure (PKI) may be used as a means of public key distribution.

DNSSEC provides a verification mechanism for DNS data. It allows a security-aware resolver to verify that the zone data it has received has been signed by the administrator of the zone who holds the private key.

BRIEF SUMMARY

A remote DNSSEC Signing Cloud system and platform may provide users with zone signing and other related cryptographic functionality for a DNS system. The remote platform may be implemented, for example, in a cloud-based or other remotely-accessible, scalable and reliable computer system.

Consistent with an exemplary embodiment of the invention, there is provided a computer-implemented method of signing a DNS zone file, the method comprising: receiving, by a computer, an indication of a first DNS zone to be signed, the indication being received from a first remote user of a plurality of remote users, each remote user having control over a separate DNS zone; retrieving, by the computer, unsigned zone data for the first DNS zone to be signed; cryptographically signing, by the computer, the retrieved zone data; and providing, by the computer, the signed zone data to a signed zone master for propagation to one or more DNS servers.

Consistent with an exemplary embodiment of the invention, there is provided a system comprising one or more servers accessible to a plurality of remote users over a network, each server further comprising: a processor; a non-transitory computer-readable storage medium storing a plurality of instructions that cause the processor to: receive an indication of a first DNS zone to be signed from a first user of the plurality of remote users, wherein each remote user has control over a separate DNS zone; retrieve unsigned zone data for the first DNS zone to be signed; cryptographically sign the retrieved zone data; and provide the signed zone data to a signed zone master for propagation to one or more DNS servers.

Consistent with an exemplary embodiment of the invention, there is provided a non-transitory computer-readable storage medium storing a plurality of instructions that cause a processor to perform a method of signing a DNS zone file, said method comprising: receiving an indication of a first DNS zone to be signed, the indication being received from a first remote user of a plurality of remote users, each remote user having control over a separate DNS zone; retrieving unsigned zone data for the first DNS zone to be signed; cryptographically signing the retrieved zone data; and providing the signed zone data to a signed zone master for propagation to one or more DNS servers.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

DETAILED DESCRIPTION

Figure 1:
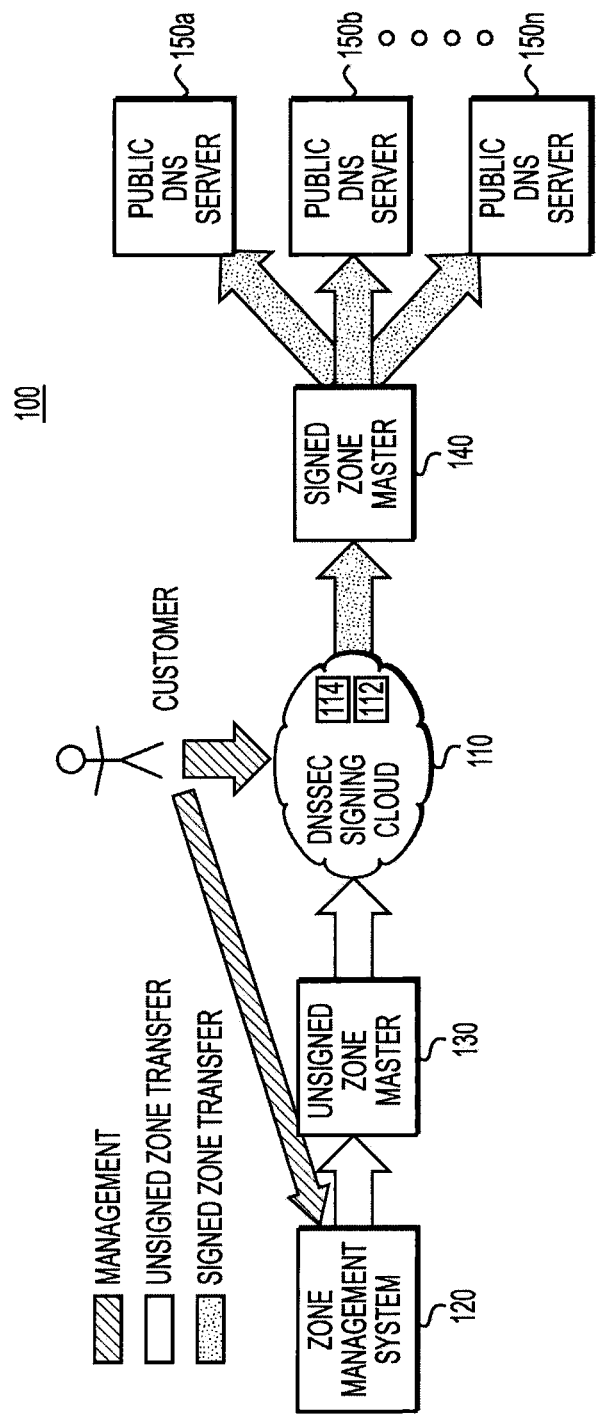
FIG. 1 is an information flow diagram for an example DNSSEC Signing Cloud system in accordance with an embodiment of the present invention.

Reference will now be made in detail to the exemplary embodiments consistent with the present invention. Wherever possible, the same reference numbers will be used throughout the drawings to refer to the same or like parts. It is apparent that the embodiments shown in the accompanying drawings are not limiting, and that modifications may be made without departing from the spirit and scope of the invention.

Embodiments consistent with the present invention may provide a cloud-based service for DNSSEC key management, zone signing, and/or other functionality to allow users to enable DNSSEC, while still allowing the client to manage and publish their own DNS information. Currently, users wishing to adopt DNSSEC have the following basic options: (1) build their own DNSSEC solution using a combination of third party and open source software along with a set of either software keys or hardware keys; (2) use a DNSSEC key management and a signing appliance (e.g., Secure64 DNS Signer, BlueCat Networks, Xelerance DNSX Secure, Signer, and Infoblox) which may provide various aspects of key management and zone signing, but require hardware to be installed at the client's site; or (3) use a Managed DNS solution that has been updated to support DNSSEC. Managed DNS providers include zone management and zone publishing features. DNSSEC enablement allows a client to turn on DNSSEC for a managed DNS zone, but require the user to migrate or outsource their DNS hosting to the managed DNS provider.

DNSSEC key management and signing appliances require installation of hardware at the user's site, require more hands-on management of key material, and do not support more than a single user.

Zone Signing Overview

DNSSEC was designed to deal with cache poisoning and a set of other DNS vulnerabilities such as man in the middle attacks and unauthorized data modification in authoritative servers. Its major objective is to provide origin authentication and integrity protection for DNS data. The public key infrastructure (PKI) may be used as means of public key distribution. DNSSEC provides a verification mechanism for DNS data and is not an encryption mechanism. It allows a security-aware resolver to verify that the zone data that has been received is signed by the administrator of the zone who holds the private key.

The DNSKEY Resource Record

A zone may have one or more key pairs, each of which includes a private key and a public key. The private keys may be stored securely in a domain name database and used to sign zone data. The public keys may be stored in the database and also stored in the signed zone data as DNSKEY resource records. The public keys are used to verify zone data. DNSKEY records typically have the following data elements:

Flags: "Zone Key" and "Secure Entry Point"
Protocol: Fixed value of 3 (for backwards compatibility)
Algorithm: The public key's cryptographic algorithm.
Public key: Public key data.

A DNSKEY Resource Record ("RR") may be either a Zone Signing Key (ZSK) or a Key Signing Key (KSK). The Key Signing Keys (KSKs) will have a SEP flag set so that they can be distinguished from the ZSKs in the DNSKEY RRset. The Key Signing Keys (KSKs) are used to sign other DNSKEY resource records and are used to build a chain of authority to the data that needs to be validated.

The RRSIG Resource Record

The RRSIG resource record holds the DNSSEC signature of a resource record set RRset (one or more DNS records with the same name, class, and type). DNSSEC enabled resolvers can verify the signature with a public key stored in a DNSKEY-record. The RRSIG-records have the following data elements:

Type Covered: DNS record type that this signature covers.
Algorithm: Cryptographic algorithm used to create the signature.
Labels: Number of labels in the original RRSIG-record name (used to validate wildcards).
Original TTL: TTL value of the covered record set.
Signature Expiration: When the signature expires.
Signature Inception: When the signature was created.
Key Tag: A short numeric value which can help quickly identify the DNSKEY-record which can be used to validate this signature.
Signer's Name: Name of the DNSKEY-record which can be used to validate this signature.
Signature: Cryptographic signature.

The DNSKEY RRs are signed the active Key Signing Keys. Other RR sets are signed by only active Zone Signing Keys.

The NSEC Resource Record

The NSEC resource record lists two separate things: the next owner name (in the canonical ordering of the zone) that contains authoritative data or a delegation point NS RRset, and the set of RR types present at the NSEC RR's owner name [RFC3845]. The complete set of NSEC RRs in a zone indicates which authoritative RRsets exist in a zone and also form a chain of authoritative owner names in the zone. These records can be used by resolvers to verify the non-existence of a record name and type as part of DNSSEC validation. NSEC-records have the following data elements:

Next domain name: The next record name in the zone (DNSSEC sorting order)
Record types: The DNS record types that exist for the name of this NSEC-record.

The NSEC3 Resource Record

The NSEC3 Resource Record (RR) provides authenticated denial of existence for DNS Resource Record Sets. The NSEC3 RRs have the same functionality as NSEC RR, except NSEC3 uses cryptographically hashed record names to prevent enumeration of the record names in a zone. An NSEC3-record links to the next record name in the zone (in hashed name sorting order) and lists the record types that exist for the name covered by the hash value in the first label of the NSEC3-record's own name. These records can be used by resolvers to verify the non-existence of a record name and type as part of DNSSEC validation. NSEC3-records have the following data elements:

Hash Algorithm: The cryptographic hash algorithm used.
Flags: "Opt-out" (indicates if delegations are signed or not).
Iterations: How many times the hash algorithm is applied.
Salt: Salt value for the hash calculation.
Next Hashed Owner Name: The name of the next record in the zone (in hashed name sorting order).
Record Types: The record types that exist for the name covered by the hash value in the first label of the NSEC3-record's own name.

DNSSEC Signing Cloud

A DNSSEC Signing Cloud may provide similar or equivalent functionality to DNSSEC key management and signing appliances described above, by supporting unsigned DNS zone transfers to a remote and/or distributed system that can provide DNSSEC services to multiple users and multiple zones. The DNSSEC Signing Cloud may use DNS zone transfers to send signed zone updates to the clients primary name server. In contrast to other techniques for managing zone signing and other functions in a DNSSEC-enabled system, a DNSSEC Signing Cloud may provide a highly scalable, highly available, and open service that greatly decreases the complexity and effort needed by a client to DNSSEC enable their zones. A DNSSEC Signing Cloud system also may be implemented without requiring specialty hardware or complex changes to a user's preexisting systems.

FIG. 1 is an information flow diagram for an example DNSSEC Signing Cloud system 100 consistent with the present invention. The service may include a Management Cloud Interface 120 to allow a user to add, modify, and remove a zone to be signed by the Signing Cloud 110. In general, an exemplary DNSSEC Signing Cloud 110 consistent with the present invention may service a highly extensible set of zones, and may transparently provide DNSSEC key management and signing through the use of DNS zone transfers from an unsigned DNS zone master server 130, to the DNSSEC Signing Cloud 110, and then to a signed DNS zone stealth master server 140. The signed DNS zone master server 140 may then push updates to slave DNS servers via DNS zone transfers for the public DNS name servers 150*a-n*. In an exemplary embodiment, each user may still manage the user's zones as they would be in a non-DNSSEC-enabled system, and may still use the same public DNS name servers. However, use of the DNSSEC Signing Cloud 110 in the DNS propagation flow allows for automatic zone signing. The DNSSEC Signing Cloud management interface 120 also may allow a user to establish a link to the Cloud 110 and to query the Cloud 110 for Delegation Signer (DS) records to be published in the parent zone.

Signing Cloud 110 may be capable of storing information and performing functions, and may include at least one processor 112, and one memory 114. Processor 112 may be one or more processor devices, such as a microprocessor, laptop computer, desktop computer, workstation, mainframe computer, etc., that execute program instructions to perform various functions. Memory 114 may be one or more storage devices that maintain data (e.g., instructions, software applications, etc.) used by the processor 112, such as volatile or non-volatile, magnetic, semiconductor, tape, optical, removable, nonremovable, or other type of non-transitory tangible storage device or non-transitory computer-readable medium. One or more of processor 112 and memory 114 may be accessed by a customer (client) to provide hardware and/or software to the customer. The customer may represent an individual computer, multiple computers, individuals, or locations that are in communication with the Signing Cloud 110.

In operation, a DNSSEC Signing Cloud 110 may act as stealth secondary nameserver to a user's unsigned zone to retrieve the zone data to be signed. The Cloud 110 then may sign the zone data, manage key rollovers, and provide secure storage of Zone Signing Keys (ZSK) and Key Signing Keys (KSK). After successful zone signing the DNSSEC Signing Cloud 110 may provide signed zone data may then be made available to customers as stealth master nameservers. For example, in an embodiment the DNSSEC Signing Cloud 110 may utilize open standards like AXFR and TSIG keys for secure zone data transfers, thus minimizing the integration efforts for the customer. In an embodiment, a DNSSEC Signing Cloud system 100 may provide users the ability to provision information of the zone to be signed thru a UI and/or API (e.g., SOAP WebServices).

In an embodiment, a user may provide a zone name, unsigned zone source name server(s) info, signed zone destination name server(s) info, and signed zone privacy (NSEC or NSEC3) to the DNSSEC Signing Cloud 110. The Cloud 110 may retrieve the zone from the user source name servers and sign the zone. A Zone Relay component of the Cloud service 100 may transfer unsigned/signed zone files from/to user name servers. Another component, such as a Signing Controller, may trigger the Zone Signer for explicit (e.g. Zone updates) and implicit (e.g., zone resigning) signing tasks. A Key Management component may generate KSKs (Key Signing Keys) and ZSKs (Zone Signing Keys) of predetermined lengths, and may track and manage Key usages and Key publishing (e.g., Key Rollover). The Zone Signer may use a SIM Signing Server or other mechanism to sign the zone files, which may provide a remote interface to cryptographic systems for signing data (byte arrays). The Zone Relay, Signing Controller, and Zone Signer components are discussed in more detail below with respect to, for example, FIG. 4.

Generally, a DNSSEC Signing Cloud 110 may include three main components: (1) a management interface, (2) zone transfer servers, and (3) zone signing and key management.

Management Interface—The Signing Cloud 110 may allow a client to authenticate and to manage the signing of zones (add, modify, delete). The customer may pass the signing preferences to the cloud 110 along with the connectivity information for the DNSSEC Signing Cloud to connect to the Unsigned Zone Master and the Signed Zone Master for zone transfers.

Zone Transfer Servers—Servers that support zone transfers (AXFR and IXFR) to support the flow of unsigned zone updates through the cloud 110 to the signed zone. The DNSSEC Signing Cloud will asynchronously handle key rollovers and resigning and send zone transfers out to the Signed Zone Master.

Zone Signing And Key Management—Manage Signing of zones on zone data changes and signature expirations, securely hold private keys for the zones, implement the key rollover schedule and generation of the Delegation Signer (DS) records that need to be sent to the parent zone by the client.

As described in further detail herein, these components may include or be implemented by one or more sub-components in a DNSSEC Signing Cloud 110.

Figure 2:
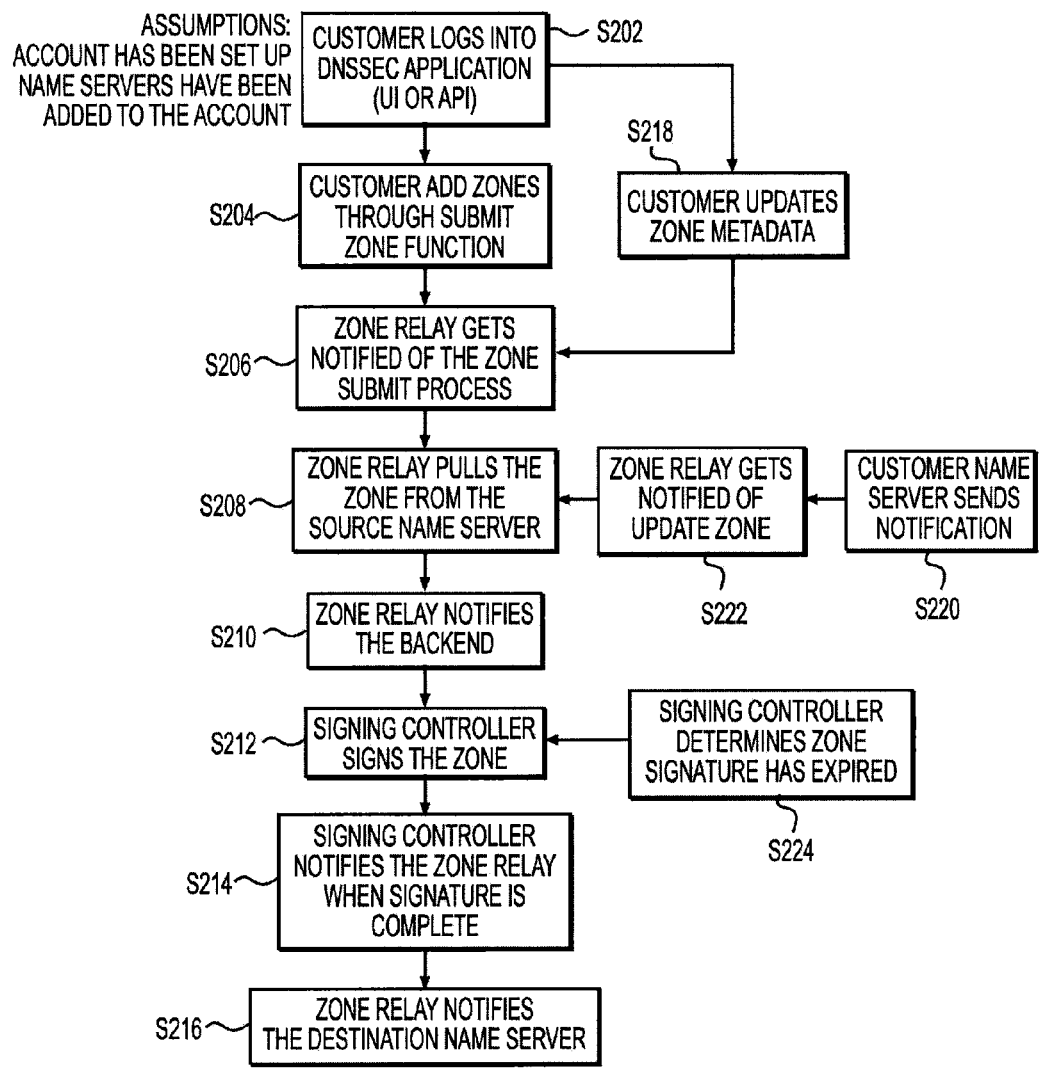
FIG. 2 shows a high-level process flow for an illustrative DNSSEC Signing Cloud system in accordance with an embodiment of the present invention.

FIG. 2 shows a high-level process flow for an illustrative DNSSEC Signing Cloud system. As shown in FIG. 2, a client may log into the Signing Cloud 110 (S202) and may add the zone or zones to be signed (S204). Subsequently, a zone relay (which may be part of the cloud service itself) may get notified for the zone that is going to be signed (S206). Subsequently, the service may pull the unsigned zone from the Source Name Server (S208), and the Zone Relay may notify the backend (S210). Subsequently, the Signing Controller may sign the zone (S212) and notify the Zone Relay when signature is complete (S214). Finally, the Zone Relay may notify the Destination Name Server (S216).

In addition, the system 100 can receive dynamic updates or updates based on client changes (e.g., additions or deletions) to zones. For example, a client can update Zone Metadata (S218), the Name Server may send a notification to the Zone Relay (220), and the Zone Relay may get notified of the update to the zone (S222). Additionally, generally if changes are made to an unsigned zone, DNSSEC signatures expire after a certain period of time such as, for example, seven to fourteen days. Thus, the Signing Controller may determine whether the zone signature has expired (S224), preferably on or before the date of expiration. Furthermore, the Signing Controller may determine whether the zone signature has expired even if changes weren't made to the zone.

Figure 3:
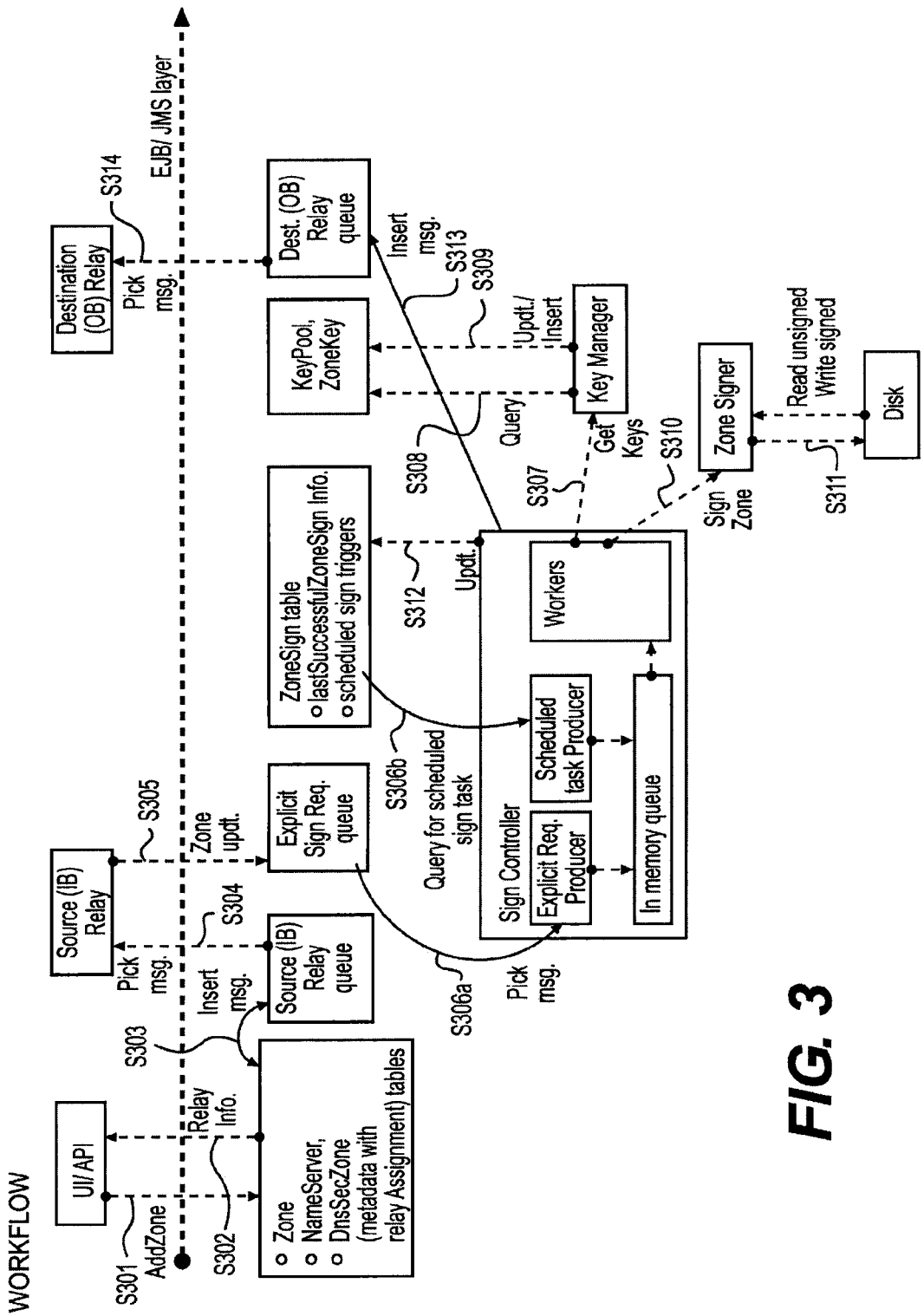
FIG. 3 shows an example workflow for an illustrative DNSEC Signing Cloud system in accordance with an embodiment of the present invention.

FIG. 3 shows an example workflow for an illustrative DNSEC Signing Cloud system. As shown in FIG. 3, a client adds a zone that needs to be signed (S301) and may pass properties to the system such as the zone, the name server the system should pull from, and the properties that the system should use to sign the zone. At the end of the call, the client receives relayed information (S302) and the server inserts a message into the Source Relay queue (S303) indicating, for example, that the client wants the service to pull the zone. Then the system puts a relay into the queue (S304) causing the system to pull the zone from the clients server. On a zone update, another message is put into the queue (S305) such as, for example, that a new zone has been created or an outdated zone needs to be signed. The Signing Controller picks the message (S306*a*), and queries for scheduled sign task (S306b), and gets the keys to use the sign (S307). The system will then query for a key to use (S308) and if it doesn't find it, it will create a new one (S309) and insert it into a zone key table.

The Zone Signer signs the zone (S310) and reads unsigned data and write signed data to the disk (S311), such as a hard disc. Then the zone sign table is updated (S312) with, for example, information relating to when the zone was signed, and the system will insert a message to the outbound relay indicating that the zone has been signed and the Destination OB Relay picks a message (S314).

Figure 4:
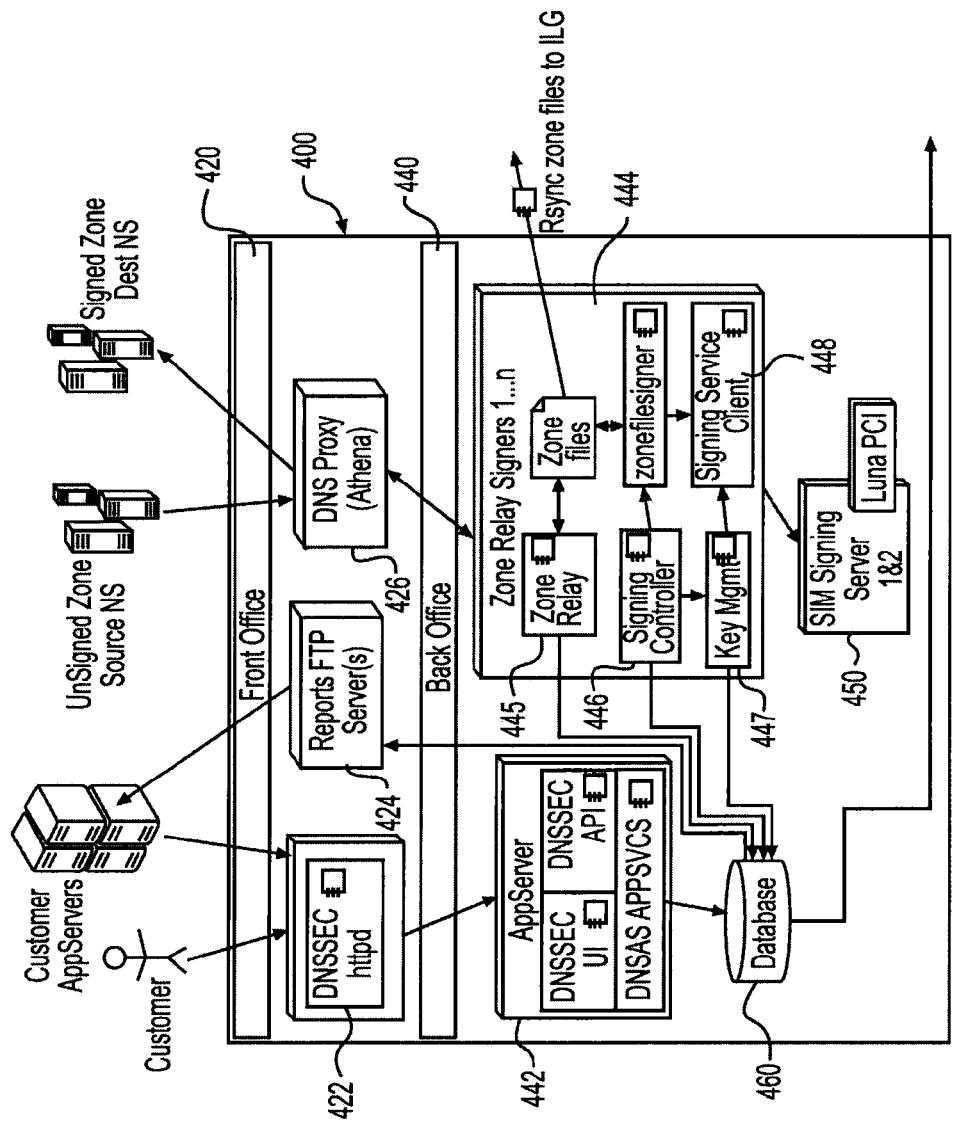
FIG. 4 shows a high level architecture diagram for an illustrative DNSSEC Signing Cloud system in accordance with an embodiment of the present invention.

FIG. 4 shows a high level architecture diagram for an illustrative DNSSEC Signing Cloud system. As shown, the DNSSEC Signing Cloud system 100 may be implemented in a data center 400 that uses a standard 3-Tier architecture including, for example, a Gateway (e.g., DNS Proxy 426) in the Front Office 420, and an Application Server 442 and Database server 460 in the Back office 440. A DNSSEC Cloud Signing service may also use dedicated web and application servers to provide reliability and manageability (e.g., DNSSEC httpd 422). One or more of the components in FIG. 4, such as, for example, Database 460 and Zone Signer 444 may communicate with one or more other data centers, and may be implemented as hardware, software, or combinations of hardware and software. In an embodiment, a DNSSEC Signing Cloud may use a common database instance with a managed DNS platform, so that it can take advantage of the platform's resolution services. The system may perform the methods discussed above with respect to FIGS. 1-3.

Zone Signer

A DNSSEC Signing Cloud may include a Zone Signer component 444 including a Zone Relay 445, a Signing Controller 446, a Key Management component 447, and a Signing Service Client 448. The Zone Signer component 444 may sign a zone with its private keys (active key signing keys and zone signing keys), such as keys created by the Key Management component 447. The signatures of the zone data are added to the signed zone in the form of RRSIG resource records. To authenticate negative responses, like NXDOMAIN or NODATA, the Zone Signer 444 may add NSEC (or NSEC3) resource records into the signed zone. The DNSKEY resource records contain the public key (of an asymmetric encryption algorithm) used in zone signing operations, the DNSKEY allows public key distribution through the DNS. The Zone Signer 444 may be implemented to sign the entire zone or sign incremental changes to a zone. The Zone Signer 444 may interface with a SIM Signing Server 450 to sign RData.

In an example, the Zone Signer 444 may be provided the following information from a controller: zone name; unsigned zone SOA# and signed zone SOA#; NSEC/NSEC3 flag and other NSEC3 parameters (salt, iteration, TTL) if it is an NSEC3 request; published/active KSK and ZSK information; DS digest ID; signature validation periods; unsigned/signed zone file location and zone file extension; and current date. After signing, the Zone Signer 444 may then return the signed zone name; a signature validity expiration date, e.g., the current date plus half value of zone signature validity period value; new SOA serial number; and the signature sign date and its expiration date. An example signing process implemented by the Zone Signer 444 may perform the following steps:
1. Load unsigned zone file from a shared disk.
2. Remove all existing DNSSEC resource records (such as RRSIG, NSEC, NSEC3, and NSEC3PARAM) if they including unsigned zone file.
3. Change SOA resource record with new SOA# and add DNSKEY resource records into the list of unsigned resource records. The DNSKY resource records are created by using PublicKey(s) from key management.
4. Add NSEC or NSEC3 and NSEC3PARAM resource records.
5. For each sign key, generate a PreRRSIG list containing unsigned bytes for each RRSET. The RRSIG's TTL may use a minimum TTL value from each RR in its corresponding RRSet.
6. For each sign key, generate an array of byte[ ] from the PreRRSIG list. Call an HSM signer component to sign these byte[ ]s. Pass List<byte[ ]> need to be signed; and the private key (string) from key management. It will return signed data in List<byte[ ]> with the same order.
7. Output signed zone resource records into a file.
8. Call verification component to verify the signed zone file.
9. Return a ZoneSign object to the caller, including a signature date, signature validation period, and SOA serial numbers.

An example verification process may include:
1. Load signed zone file and compare RRsets with an input unsigned zone file.
2. Verify SOA serial number.
3. Get trust keys information from DNSKEY resource records.
4. Group resource records into a RRset (include its RRSIG resource record) list.
5. Verify each RRset with its RRSIG record. In some cases, only limited types of resource records may be verified.

Key Manager

A Key Manager 447 may be used to track signing schedules for KSKs and ZSKs. Key Management also may include or be implemented in an API that manages Key generation and Key rollover.

Several relevant periods may be managed by the Key Manager 447, including: (1) a pre-publish period; (2) an active period; (3) a post-publish period; (4) a signature validity period; and (5) emergency key rollover.

Pre-publish period: Keys are pre-published in the zone for a configured period before they are used for signing. For example, for a KSK, this may allow time for inclusion of a DS record in a parent by a user. In some cases this may not be required for ZSKs, hence it may be acceptable to entirely forego a pre-publish requirement in case of an emergency rollover or in other situations.

Active period: Keys can be active for a configured period, after which they may be rolled over. Smaller key sizes may be recommended to have smaller active period, as they generally are easier to compromise.

Post-publish period: Keys may be published in the zone for configured post-publish period after the ActiveEndDate, to accommodate resolvers that may have cached the prior signed zone (typically until at least a maximum signature validity period of the prior signed zone RRSIG).

Signature Validity Period: When a zone is signed, the signed records have a signature validity period, typically (several times) less than the KeyActivePeriod. A zone may be resigned and uploaded to an authoritative nameserver before the end of the Signature Validity Period, and may be uploaded at least one TTL (e.g., SOA TTL or Max TTL) before the end of the Validity Period.

Figure 5:
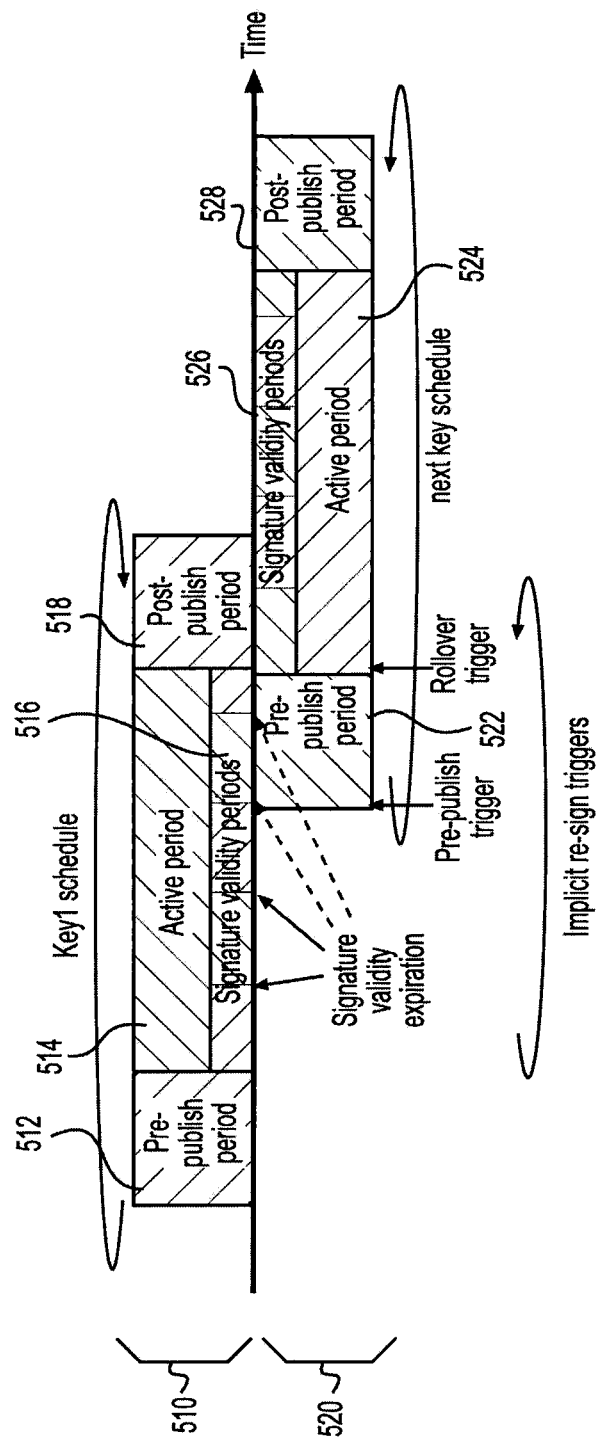
FIG. 5 shows an exemplary depiction of when a zone is resigned based on an exemplary key schedule.
Figure 6:
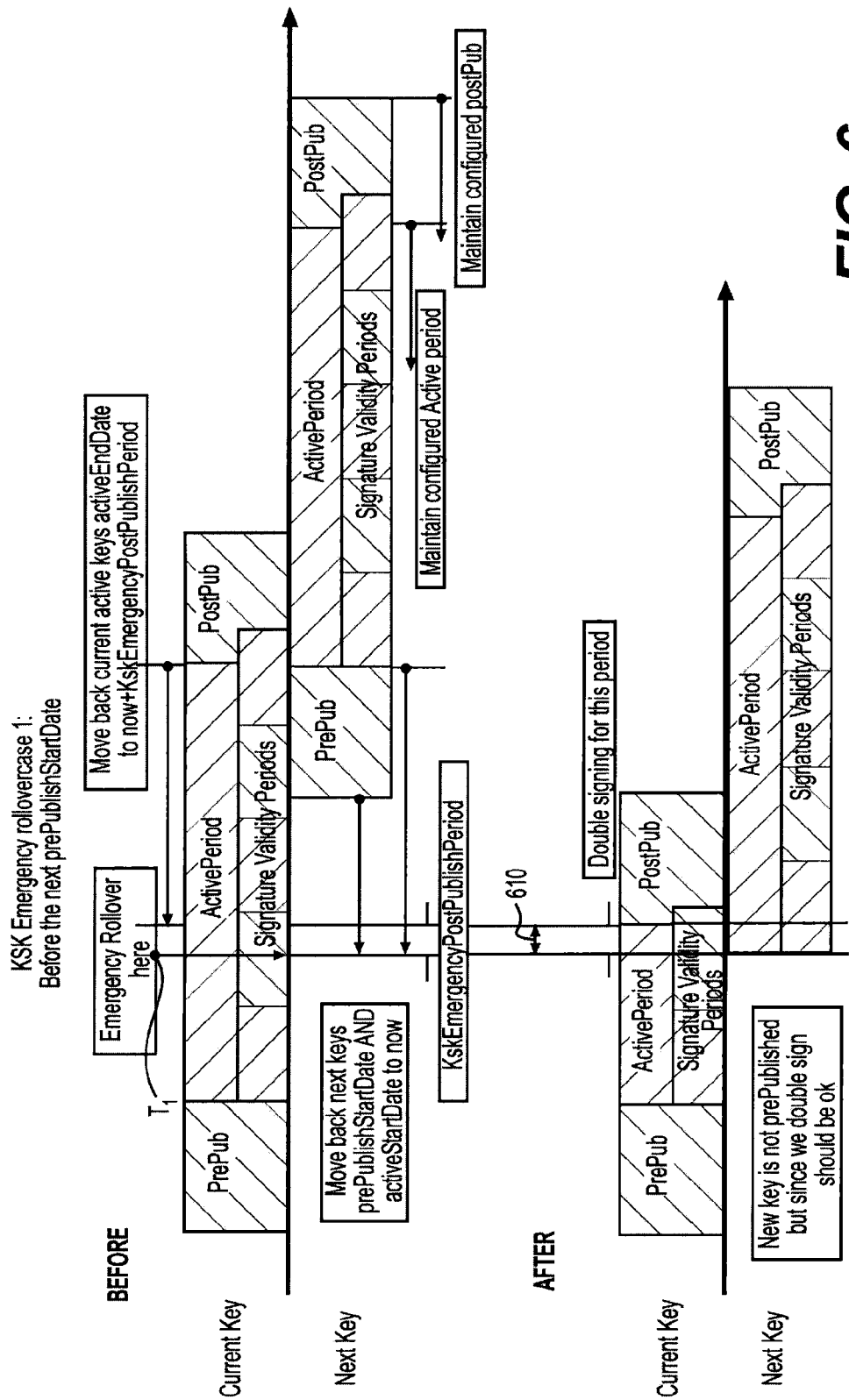
FIGS. 6-8 show various examples of emergency rollover procedures.
Figure 7:
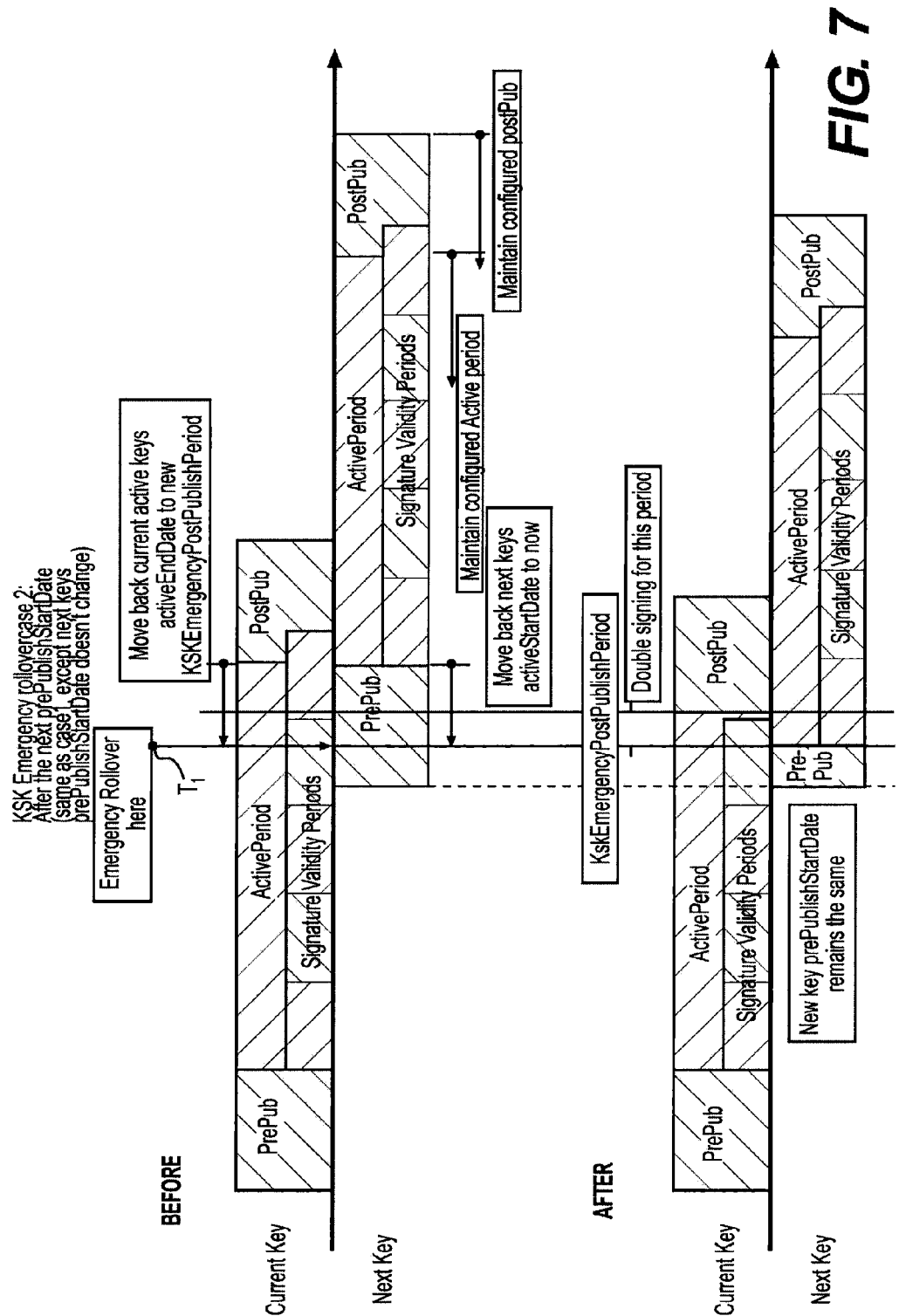
Figure 8:
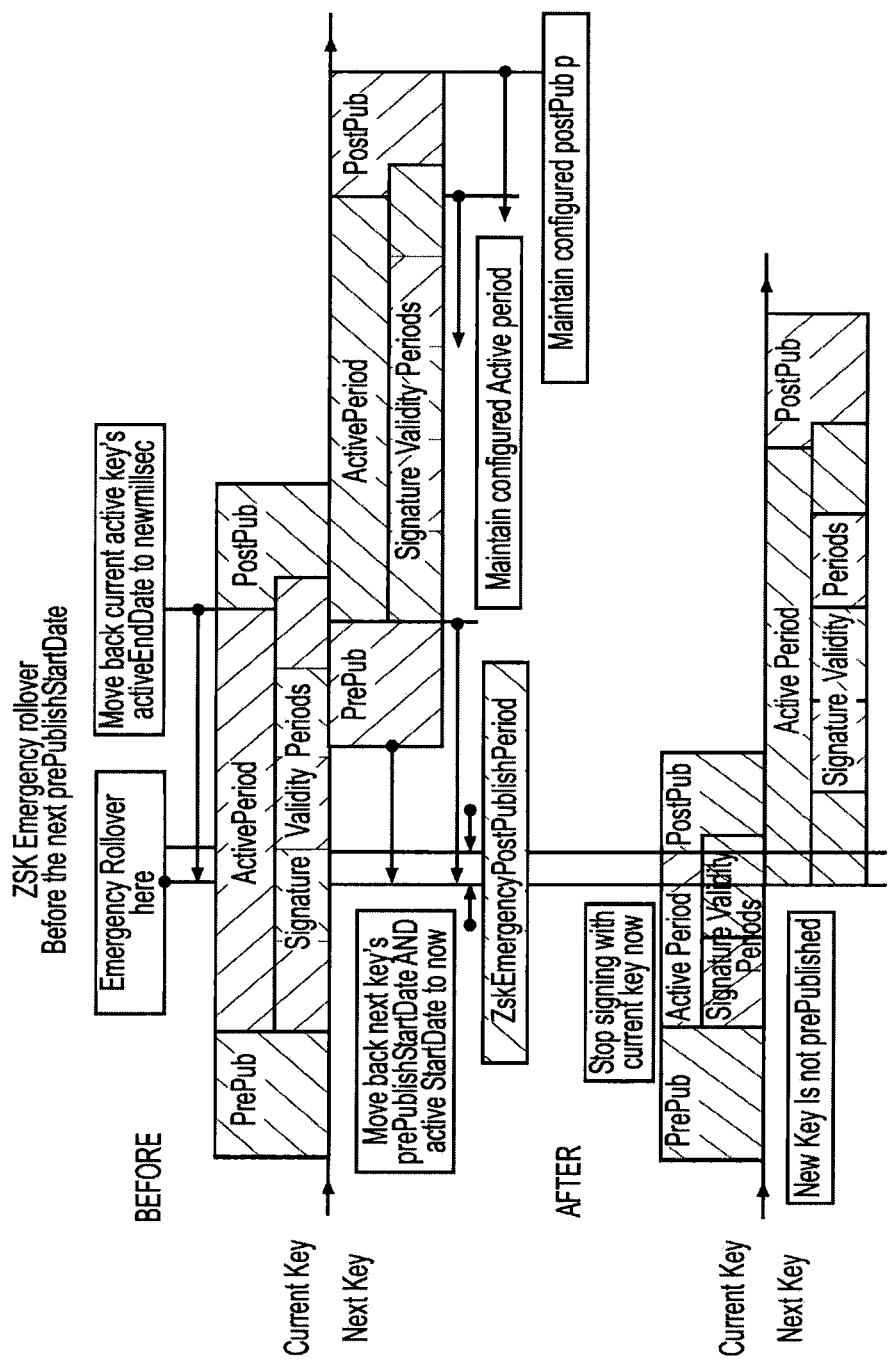

Emergency Key Rollover: In the event of a compromised key, there may be an explicit (unscheduled) signing request to rollover to the next scheduled key as soon as possible. FIG. 5 demonstrates an exemplary life cycle of a current key and a next key based on an exemplary key schedule, while FIGS. 6-8 show various examples of emergency rollover procedures.

Referring to FIG. 5, the life cycle of a key may include various periods, such as a pre-publish period, an active period, a signature validity period, and a post-publish period. As shown in FIG. 5, an exemplary current key 510 life cycle includes pre-publish period 512, active period 514, signature validity period 516, and post-publish period 518. Similarly, an exemplary next key life cycle 520 includes a pre-publish period 522, an active period 524, a signature validity period 526, and a post-publish period 528.

If an explicit sign request is received by the system 100 (e.g., a zone update), the system 100 may look up the schedule for that instant in time from, for example, a database, and sign with the keys that are in the active period 514. If a key is in a pre or post publish period at the instant in time, then that key is simply published in the signed zone. However, if a sign request is received by the system at exactly the instant in time when a rollover is scheduled, then only one of the keys may be used for signing and the other may merely be published.

The system 100 is also capable of implicit signing, in which the system actively monitors are re-signs at times when there is no explicit request. This may occur when a key needs to be pre-published, when a key needs to rollover, or at a specific trigger point, such as, for example, the halfway point of the signature validity period of RRSIGs in the zone.

FIG. 6 demonstrates an exemplary Key Signing Key Emergency rollover. In particular, FIG. 6 demonstrates an exemplary life cycle of a current key and an exemplary life cycle of a next key before and after the rollover. An event triggers an emergency rollover of the Key Signing Key at a time T1, which happens before the start of the prepublish period of the next Key Signing Key. Thus, the start date of the prepublish and active periods of the next KSK is advanced to the current time, the active period of the current Key Signing Key is reduced, and the PostPublish period of the current Key is advanced. This may create a "double signing" period 610 in which both keys are used for a short interval. Furthermore, the next key after the emergency rollover may not be prePublished.

As another example, FIG. 7 demonstrates a second exemplary Key Signing Emergency rollover. As shown in FIG. 7, the event that triggers the Emergency Key rollover happens at a point in time T1 where the prepublish period of the new Key Signing Key has begun, but before the start of the active period of the new key. The exemplary approach for the Key Signing Key rollover is to advance the start of the active period for the next key to the current time, and continue to use both keys for a short interval resulting in double signing for a period of time.

FIG. 8 illustrates a third exemplary Key Signing Emergency rollover. An event that requires an emergency rollover of the Zone Signing Key happens during the active period of the current Key. The approach is to advance the start active period of the next key and end the active period of the old compromised key. These periods might be advanced to the time of the rollover event with no prepublish period (as shown in FIG. 8) or within a short time frame of the rollover event to allow the prepublish of the new key as required.

Figure 9:
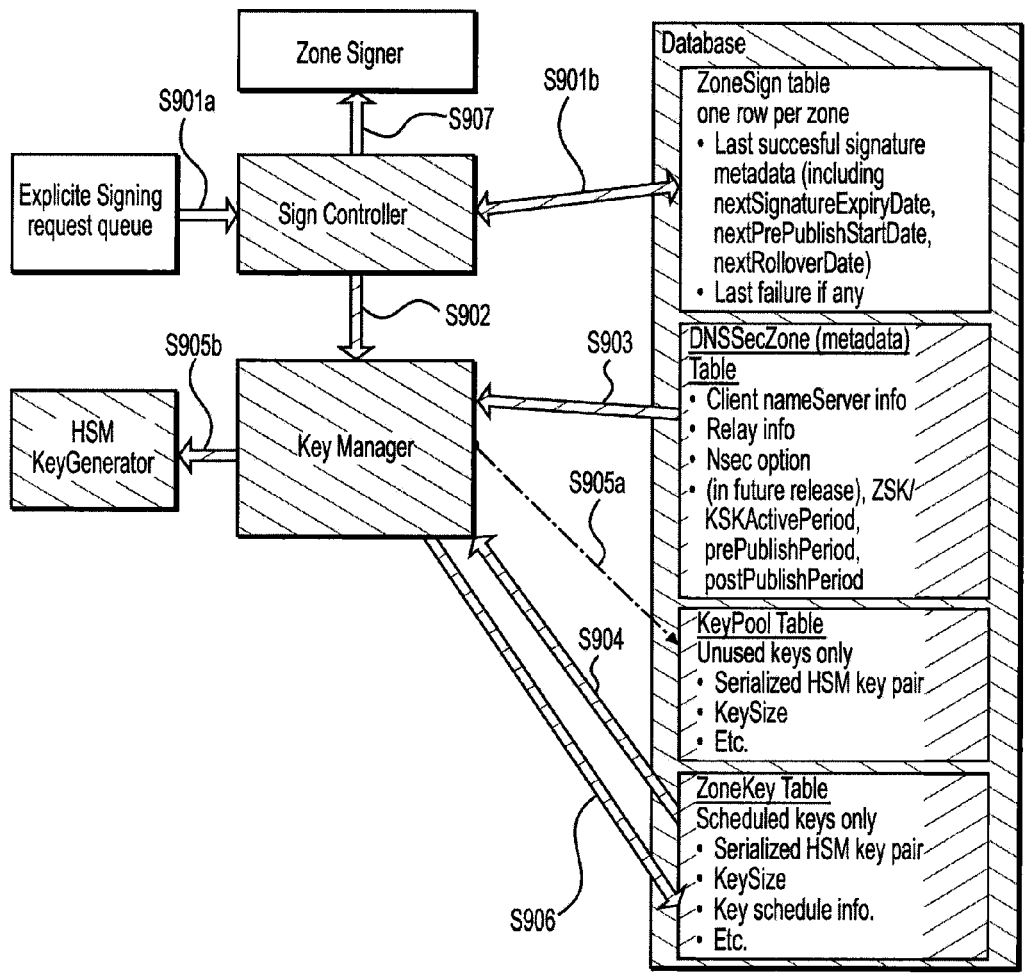
FIG. 9 shows an example interaction between a Key Manager and various other components in an illustrative embodiment of a DNSSEC Signing Cloud.

FIG. 9 shows an example interaction between a Key Manager 447 and various other components in an illustrative embodiment of a DNSSEC Signing Cloud. 110. As shown in FIG. 9, the Signing Controller 446 receives an explicit signing request from the queue (S901a) and communicates with the Database 460. For example, the Signing Controller 446 may communicate with a zonesign table in the Database 460 (S901b) to determine the last successful signature and/or if there has been any failure. The Signing Controller may then communicate with the Key Manager 447 (S902) to request a set of keys that are needed to sign the zone. The Key Manager 447 may then communicates with the Database 460 (e.g. the DNSSecZone Table in Database 460) to obtain metadata (S903) and may also communicate with the ZoneKey Table of Database 460 (S904). In some instances, the system 100 may communicate with the KeyPool table of Database 460 (S905a) if it needs a new set of keys to verify whether there are any Keys in the KeyPool table that can be or used. If not, the Key Manager will issue a request to the HSM Key Generator (S905b) to generate the keys and store that information in the Key Pool table. After the keys are received, the system 100 updates the ZoneKey Table with other metadata (S906) and subsequently the Signing Controller 446 signs the zone (S907).

While Database 460 includes a number of separate tables, one of ordinary skill in the art would understand that any number of tables could be used. For example, all of the information contained in the ZoneSign table, the DNSSecZone Table, the KeyPool Table, and the ZoneKey Table may be included in a single table in Database 460.

Zone Relay

Referring back to FIG. 4, Zone Relay servers 445 typically may be open to the public Internet and thus likely will run in the Front Office due to security reasons. However, the Zone Signer component 444 typically may run in the back office to secure signed zone files, and may have access to unsigned zone files; signed zone files may need to be transferred to zone relays in the Front Office 420. To reduce the complexity of file movements between Front and Back Office portions of the system and secure the unsigned and signed zone files, a Zone Relay component 445 may be executed in the Back Office 440, for example on the same server as the Zone Signer component 444. A DNS Proxy service 426 may be deployed in the Front Office section to route DNS requests to Zone Relay servers 445 and may provide additional protection by providing different access controls to backend relay servers.

In some configurations, Zone Relay servers 445 are responsible for transferring in unsigned zones from customer name servers (in this relationship, a Relay is a slave to the customer's master), and for transferring signed zones back to customer name servers (in which relationship a Relay is a master to the customer's slave). It may use common DNS XFER protocols, so that customers are able to manage zones in a conventional manner. Zone Relays 445 also may be responsible for informing the back-office applications whenever they've transferred in a zone for any reason (either because the back-office requested it, or because the customer updated the zone). In some configurations, they are not involved in key management or rollover, or any other aspects of zone signing. In fact, it is possible to configure Zone Relay servers 445 such that they are not "aware" of any DNSSEC functionality, but rather as simply generic relay servers that will accept and send DNS notifications and transfer requests for the zones for which they are responsible.

Figure 10:
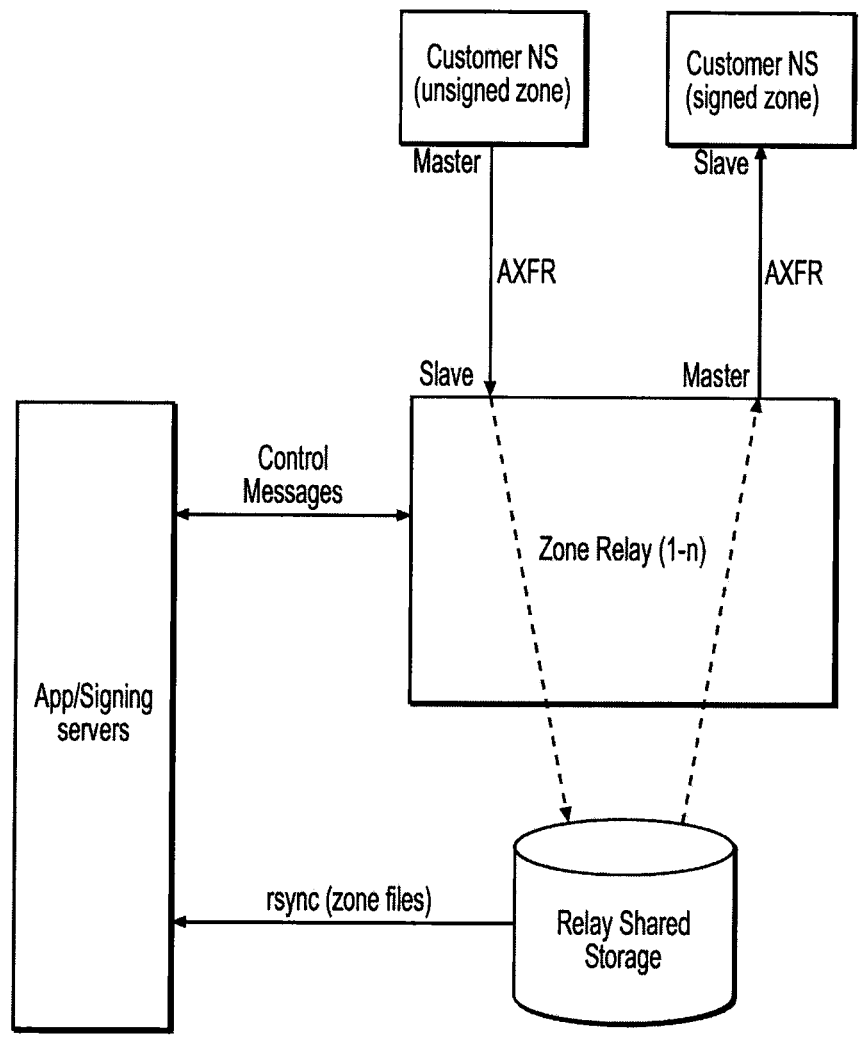
FIG. 10 shows an example logic flow for one or more Zone Relays.

FIG. 10 shows an example logic flow for one or more Zone Relays 445. In the example, the primary functionality of the Relay is to transfer unsigned zones from customer name servers, and transfer signed zones back out. As previously described, the Zone Relays 445 may be configured such that they do not distinguish between a signed and an unsigned zone, but just pull and push (or notify in/AXFR in, notify out/AXFR out) zones. When a zone is added to a relay, several pieces of information may be required: the zone name; the server(s) from which to transfer the zone (the inbound source); and the server(s) to notify when it's time to send the zone back out (the destination targets).

In order that a Relay 445 may retrieve a zone, a user's primary name server for the unsigned version of the zone may consider the Relay a slave, or secondary server. Likewise, for the Relay to be able to send the zone back out after processing, it may require at least one customer name server that considers itself a slave to the Relay. Unlike traditional BIND or other DNS servers, a Relay may be capable of considering itself to be both a master and a slave for a single zone.

Once a new zone is added, the following steps may be performed:

The Relay requests a DNS transfer (AXFR) from the customer name server to which it considers itself a slave.

When the zone is transferred in, the Relay persists the zone data for processing.

The Relay informs the application that the zone is ready to be picked up and processed.

The application retrieves the zone file from the Relay.

When a customer updates their zone, a notification may be sent from the customer's primary name server to the Relay, the Relay performs a SOA query to check to determine if zone is updated, and then the above steps may be performed. After processing, the steps may be performed in reverse:

The application writes the processed zone file and notifies the Relay that the zone is ready to be transferred out.

The Relay sends DNS notifications to any configured customer slave servers.

The customer name servers perform a SOA request against the Relay to compare serial numbers, and then perform an AXFR to retrieve the updated signed zone file.

Signing Controller

The Signing Controller component 446 may retrieve explicit zone signing requests from a queue, and/or poll for a next required zone signing according to a defined schedule. The Controller 446 also may coordinate triggers of signing requests. The Signing Controller 446 may be, for example, a daemon process that interacts with the database and a key manager to determine one or more zones to be signed. The Controller 446 may invoke the Zone Signer component 444 by passing zone names and a related key schedule.

Figure 11:
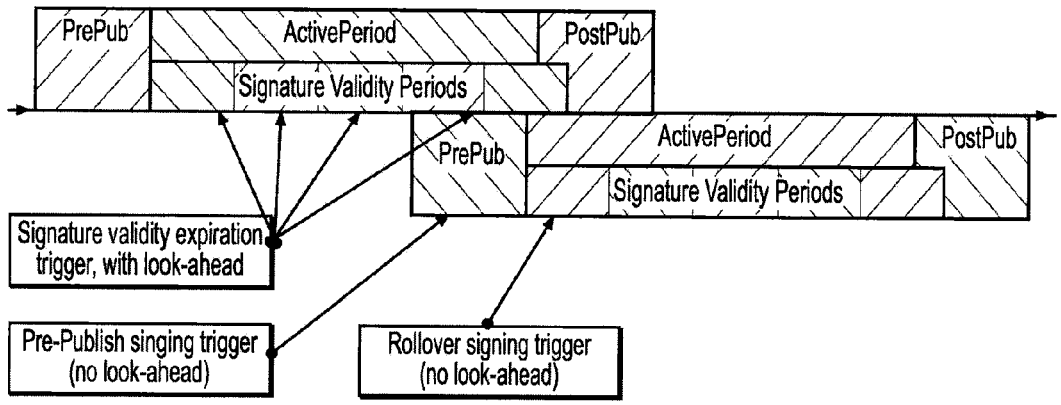
FIG. 11 shows an example of scheduled signing triggers in a DNSSEC Signing Cloud system.

FIG. 11 shows an example of scheduled signing triggers (e.g., implicit signing) in a DNSSEC Signing Cloud system 100. In particular, FIG. 11 shows various exemplary resigning triggering points within specified periods of signature expiration (e.g., the end of the signature validity period), start of pre-publish period of next key, start of active period of Next key, and the like. Exemplary resigning triggering points, such as signature validity expiration triggers, may be scheduled before the current key expires. Thus, the system may "look-ahead" for a period of time, instead of waiting for a key to expire to ensure that there is a transition between the current key and the next key before the signature validity period expires. In addition to the signature validity expiration trigger, the system may include a pre-publish signing trigger and a rollover signing trigger. The pre-publish signing trigger and the rollover signing trigger may not require any type of "look-ahead"

Figure 12:
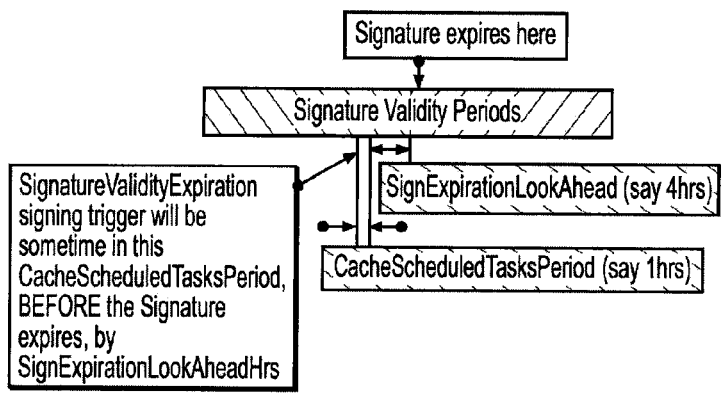
FIG. 12 shows an example of a signature validity expiration trigger.

FIG. 12 shows an example of a signature validity expiration trigger, such as the signature validity expiration trigger between two signature validity periods. As the system may be designed to handle large volumes of zones which could trigger resigning of multiple zones, the system may look ahead for certain time periods (e.g. 4 hours) to trigger signing events. Thus, in the exemplary embodiment shown in FIG. 12, the system at time T would determine all of the signatures that will expire within 4 hours of time T, and would queue them to be signed before they expired.

In addition, the system shown in FIG. 12 may be capable of managing momentary peak loads on the system. In particular, there may be situations in which there are a number of zones with the same expiration period. Instead of waiting to schedule those signing tasks, a scheduler (not shown) may select one or more of the tasks that need to be completed in the next period (e.g., in the next hour) and cache them (CacheScheduledTasksPeriod). This allows for an hour of time to finish the tasks and thereby distribute the load over a period of time. Thus, the trigger for the next signature could be 5 hours before the signature's expiration (4 hr SignExpirationLookAhead+1 hr CacheScheduledTasksPeriod).

While in this embodiment the CacheScheduledTasksPeriod is set to one hour and the SignExpirationLookAhead is set to four hours, any time period may be used. For example, the CacheScheduledTasksPeriod may not be used at all, or may be set to zero such that the system does not "look-ahead." As another example, the SignExpirationLookAhead could be configured to 7 days such that resigning was retriggered every $7^{th}$ day.

Figure 13:
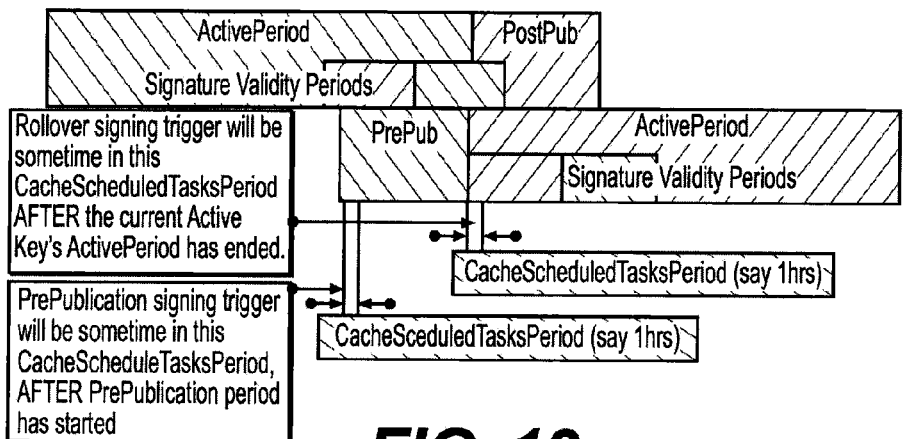
FIG. 13 shows an example of pre-publish and rollover triggers.

FIG. 13 shows an example of pre-publish and rollover triggers. As shown in FIG. 13, the Rollover signing trigger may be within the CacheScheduledTasksPeriod after the current Active Key's ActivePeriod has ended. Furthermore, the PrePublication signing trigger may occur sometime during the CacheScheuleTasksPeriod, after the PrePublication period has started. For example, assume that the resigning occurs 3 days before the signature expires. Since the key is still active, it's used for a particular period of time (e.g., 14 days). Accordingly, validation continues beyond the active period, into the PostPub period. While in this exemplary embodiment the resigning occurred 3 days before the signature expired and the period of time used for signing by the system is 14 days, any period of time may be used.

Figure 14:
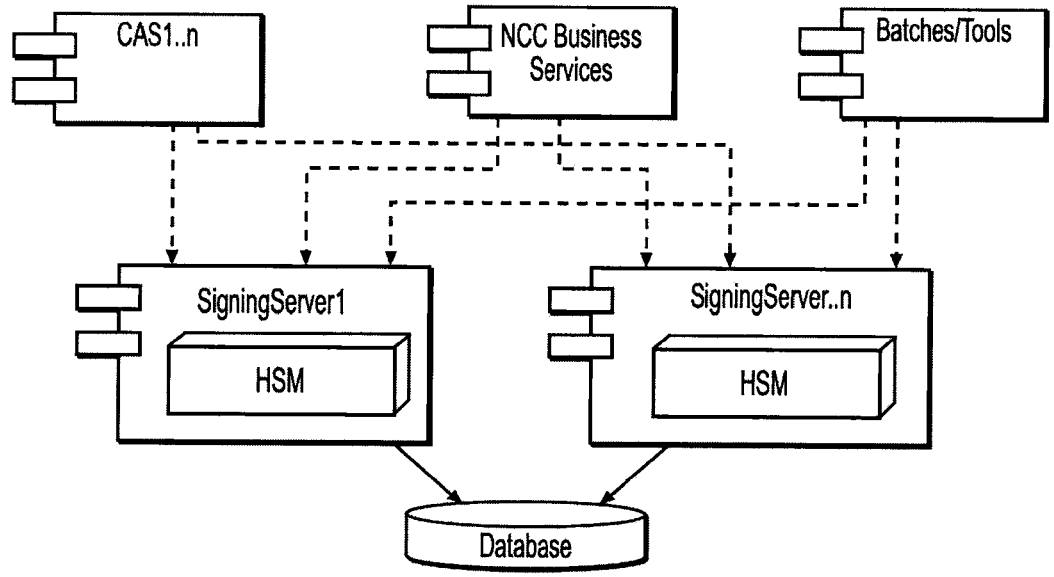
FIG. 14 shows an example Signing Server configuration suitable for use in a DNSSEC Signing Cloud.
Figure 15:
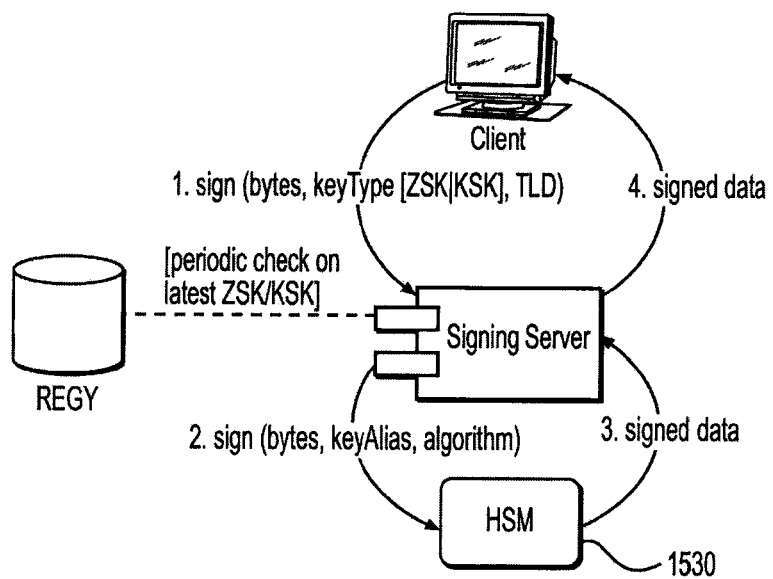
FIG. 15 shows an example data flow among a user client, a signing server, and an HSM.

FIG. 14 shows an example Signing Server 448 configuration suitable for use in a DNSSEC Signing Cloud 110. A Signing Server 448 may receive signing requests from clients, and use a hardware security module (HSM) and/or software to sign the data. FIG. 15 shows an example data flow among a client, a Signing Server 448, and a HSM 1530. In a DNSSEC Signing Cloud system 100 the HSM 1530 may return signed data, which in turn is returned to the client. In an example configuration, a HSM 1530 may be loaded with multiple ZSKs and/or KSKs per top level domain or zone at initialization time. Each key may be known to the HSM 1530 by an alias. The client may tell the signing server which of the two kinds of key to use (ZSK or KSK), and the TLD and the server will know the current key-alias name for that kind of key when it talks to the HSM 1530 for signing.

Web Application

A DNSSEC Signing Cloud system 100 as described herein may include one or more web applications accessible by users to manage zones controlled by each user. Various functionality may be presented to different users or different types of users. For example, new account creation, emergency key rollover, and other similar functions may be limited to a CSR, while both CSR and customer accounts may be provided access to manage users in a customer account, and/or set permission levels for users in the account.

As another example, a customer account user may submit a zone to be signed. When submitting a zone, the user may provide the Zone Name, choose to use NSEC or NSEC3, specify the inbound primary name server, an option backup inbound name server and up to four outbound name servers.

As described above, systems and methods consistent with the invention provide a DNSSEC Signing Cloud system. For purposes of explanation only, certain aspects and embodiments are described herein with reference to the components illustrated in FIGS. 1-15. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-15 are exemplary and not intended to be limiting. Thus, other process stages may be used, and even with the processes depicted in FIGS. 1-15, the particular order of events may vary without departing from the scope of the present invention. Moreover, certain process stages may not be present and additional stages may be implemented in FIGS. 1-15. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of signing a DNS zone file, the method comprising:
    receiving, by a computer, an indication of a first DNS zone to be signed, the indication being received from a first remote user of a plurality of remote users, each remote user having control over a separate DNS zone;
    retrieving, by the computer, unsigned zone data for the first DNS zone to be signed;
    cryptographically signing, by the computer, the retrieved zone data; and
    providing, by the computer, the signed zone data to a signed zone master for propagation to one or more DNS servers;
    wherein the computer is configured to provide signed zone data to a signed zone master for each of the separate DNS zones in response to requests from each of the plurality of remote users.

2. The method of claim 1, further comprising:
    receiving, by the computer, a second indication of a second DNS zone to be signed, the second indication being received from a second remote user from the plurality of remote users;
    retrieving, by the computer, unsigned second zone data for the second DNS zone to be signed;
    cryptographically signing the retrieved second zone data; and
    providing, by the computer, the signed second zone data to the signed zone master for propagation to one or more DNS servers.

3. The method of claim 1, further comprising storing, by the computer, a key signing key for the first DNS zone.

4. The method of claim 1, further comprising storing, by the computer, a zone signing key for the first DNS zone.

5. The method of claim 1, further comprising tracking, by the computer, a schedule for a key signing key for the first DNS zone and a zone signing key for the second DNS zone.

6. The method of claim 1, further comprising generating, by the computer, a key signing key for the first DNS zone and a zone signing key for the first DNS zone, wherein the computer cryptographically signs the retrieved zone data with the key signing key and the zone signing key.

7. A system comprising one or more servers accessible to a plurality of remote users over a network, each server further comprising:
    a processor;
    a non-transitory computer-readable storage medium storing a plurality of instructions that cause the processor to;
        receive an indication of a first DNS zone to be signed from a first user of the plurality of remote users, wherein each remote user has control over a separate DNS zone;
        retrieve unsigned zone data for the first DNS zone to be signed;
        cryptographically sign the retrieved zone data; and
        provide the signed zone data to a signed zone master for propagation to one or more DNS servers;
        wherein the one or more servers are configured to provide signed zone data to a signed zone master for each of the separate DNS zones in response to requests from each of the plurality of remote users.

8. The system of claim 7, said instructions further causing the processor to:
    receive a second indication of a second DNS zone to be signed from a second remote user of the plurality of remote users;
    retrieve unsigned second zone data for the second DNS zone to be signed;
    cryptographically sign the retrieved second zone data; and
    provide the signed second zone data to the signed zone master for propagation to one or more DNS servers.

9. The system of claim 7, said instructions further causing the processor to store a key signing key for the first DNS zone.

10. The system of claim 7, said instructions further causing the processor to store a zone signing key for the first DNS zone.

11. The system of claim 7, said instructions further causing the processor to track a schedule for a key signing key for the first DNS zone and a zone signing key for the second DNS zone.

12. The system of claim 7, said instructions further causing the processor to generate a key signing key for the first DNS zone and a zone signing key for the first DNS zone, wherein cryoptographically signing the retrieved zone data comprises signing the retrieved zone data with the key signing key and the zone signing key.

13. A non-transitory computer-readable storage medium storing a plurality of instructions that cause at least one processor to perform a method of signing a DNS zone file, said method comprising:
    receiving an indication of a first DNS zone to be signed, the indication being received from a first remote user of a plurality of remote users, each remote user having control over a separate DNS zone;
    retrieving unsigned zone data for the first DNS zone to be signed;
    cryptographically signing the retrieved zone data; and
    providing the signed zone data to a signed zone master for propagation to one or more DNS servers;
    wherein the at least one processor is configured to provide signed zone data to a signed zone master for each of the separate DNS zones in response to requests from each of the plurality of remote users.

14. The computer-readable storage medium of claim 13, said method further comprising:
   receiving an indication of a second DNS zone to be signed from a second remote user from the plurality of remote users;
   retrieving unsigned second zone data for the second DNS zone to be signed;
   cryptographically signing the retrieved second zone data; and
   providing the signed second zone data to the signed zone master for propagation to one or more DNS servers.

15. The computer-readable storage medium of claim 13, said method further comprising storing a key signing key for the first DNS zone.

16. The computer-readable storage medium of claim 13, said method further comprising storing a zone signing key for the first DNS zone.

17. The computer-readable storage medium of claim 13, said method further comprising tracking a schedule for a key signing key for the first DNS zone and a zone signing key for the second DNS zone.

18. The computer-readable storage medium of claim 13, said method further comprising generating a key signing key for the first DNS zone and a zone signing key for the first DNS zone, wherein
   cryoptographically signing the retrieved zone data comprises signing the retrieved zone data with the key signing key and the zone signing key.

19. The computer-readable storage medium of claim 13, said method further comprising storing a key signing key for the second DNS zone.

20. The computer-readable storage medium of claim 13, said method further comprising storing a zone signing key for the second DNS zone.

* * * * *